(12) United States Patent
Boylan et al.

(10) Patent No.: US 8,946,932 B2
(45) Date of Patent: Feb. 3, 2015

(54) CONFIGURABLE DISTRIBUTED POWER MODULE

(76) Inventors: Jeffrey J. Boylan, Richardson, TX (US); Carl Milton Wildrick, Parker, TX (US); Sun-Wen Cyrus Cheng, Plano, TX (US)

(*) Notice: Subject to any disclaimer, the term of this patent is extended or adjusted under 35 U.S.C. 154(b) by 673 days.

(21) Appl. No.: 12/901,278

(22) Filed: Oct. 8, 2010

(65) Prior Publication Data
US 2012/0086270 A1 Apr. 12, 2012

(51) Int. Cl.
 H02J 1/00 (2006.01)
 G05F 1/577 (2006.01)
 H02J 3/00 (2006.01)
 H02M 7/00 (2006.01)
 H02M 1/00 (2006.01)

(52) U.S. Cl.
 CPC .............. *H02M 7/003* (2013.01); *H02M 1/00* (2013.01)
 USPC ............................................ 307/82; 323/267

(58) Field of Classification Search
 USPC .......... 307/66, 71, 75, 77, 82, 11, 34, 38, 58; 361/790; 323/267
 See application file for complete search history.

(56) References Cited

U.S. PATENT DOCUMENTS

| 5,006,973 A * | 4/1991 | Turner ............................ 363/34 |
| 7,760,522 B2 * | 7/2010 | Nobiki et al. .................... 363/25 |
| 8,319,114 B2 * | 11/2012 | Cheng et al. ................... 174/260 |
| 2005/0094330 A1 * | 5/2005 | Guenther et al. ............... 361/18 |
| 2008/0123312 A1 * | 5/2008 | Cheng et al. ................... 361/790 |
| 2008/0238208 A1 * | 10/2008 | Potter et al. ..................... 307/75 |
| 2010/0305792 A1 * | 12/2010 | Wilk et al. ....................... 701/22 |

* cited by examiner

*Primary Examiner* — Rexford Barnie
*Assistant Examiner* — Rasem Mourad
(74) *Attorney, Agent, or Firm* — David W. Carstens; Sudhakar V. Allada; Carstens & Cahoon, LLP

(57) ABSTRACT

The present invention provides a configurable dc-dc power converter module and method of manufacture for such module. The power converter module comprises an isolated subassembly with a capacitor bank, control circuits and an isolated power train that converts an input voltage to an intermediate bus voltage. The power module further comprises multiple non-isolated power trains electrically coupled to the isolated subassembly that are powered by the intermediate bus voltage to produce output voltages. The number of output voltages is determined by the number of populated non-isolated power trains, which may include all of the non-isolated power trains in the power module or a subset thereof. In one embodiment of the invention the non-isolated power trains are located on a carrier PWB that is electrically coupled to the bus PWB.

47 Claims, 10 Drawing Sheets

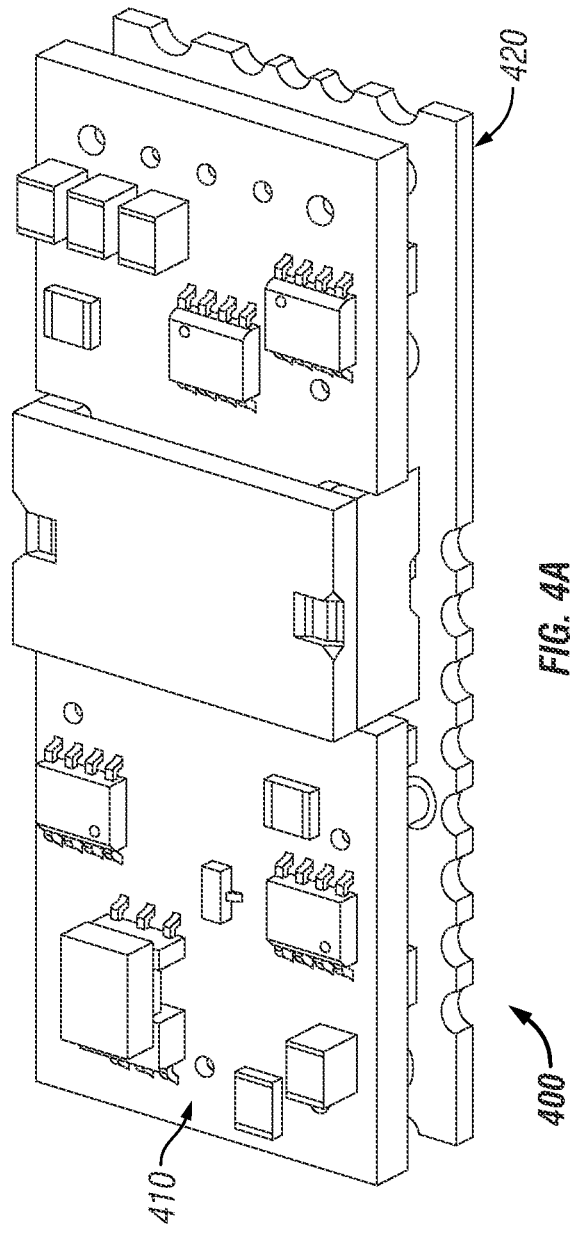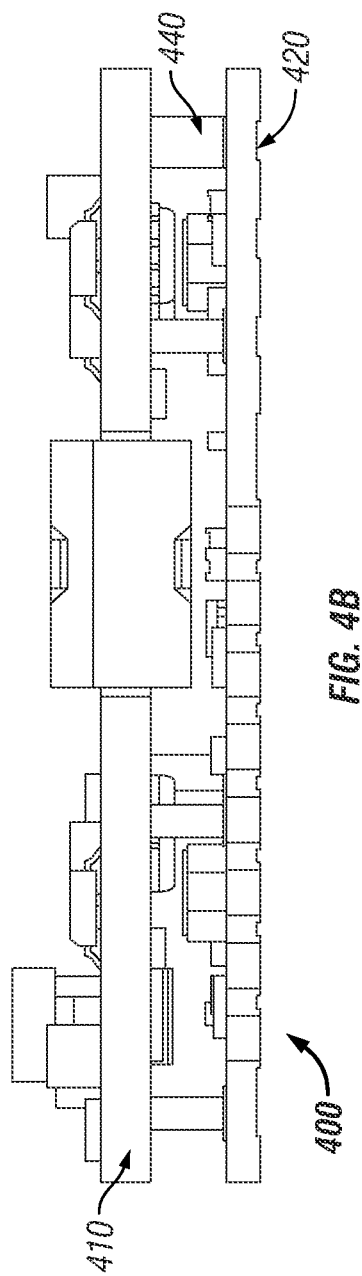
FIG. 4A
FIG. 4B

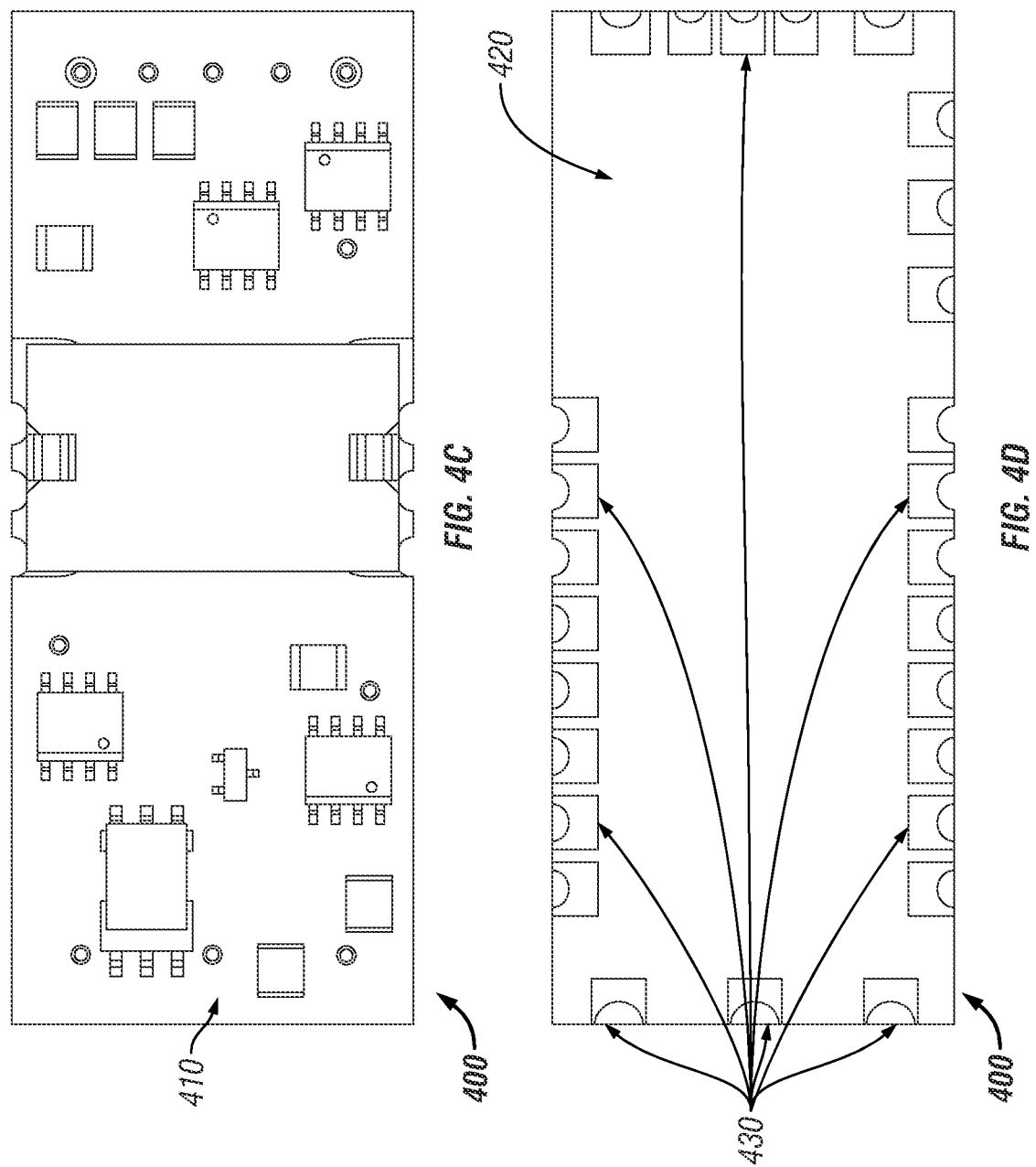

CONFIGURABLE DISTRIBUTED POWER MODULE

TECHNICAL FIELD

The present invention relates in general to power converter modules, and more specifically to power modules with multiple output voltages.

BACKGROUND OF THE INVENTION

As the power module industry has matured, commercially available dc-dc power converter modules have achieved widespread usage in many distributed power architectures commonly employed in networking and telecommunications equipment. At present, many systems have begun employing a combination of both isolated dc-dc power modules and point-of-load (POL) modules.

Before distributed power architectures with power modules were widely employed (so-called bulk-power supplies), isolated, multi-output power supplies were (and still are) used in many applications. These isolated, multi-output power supplies typically featured either multiple isolated power trains in one package or isolated power trains that had multiple outputs. In general, the power magnetics, especially the power transformers, were fairly complex, expensive, custom devices. If additional output voltages were required or the load was partitioned differently, a significant redesign effort would be required. Typically, the isolated designs featured relatively slow dynamic performance characteristics that were not well suited for driving lower voltage rails that are common in today's power systems.

The power module industry later began offering both single- and multi-output isolated power modules. FIG. 1 shows a typical prior art configuration that employs separate isolated modules 101-103 for each output voltage rail Vo1-Vo3. Customers select a brick module for each rail that is appropriate for their load. Although the solution generally works, the cost of using many isolated power modules is quite high due to the presence of many control circuits and power transformers, and similar to the earlier bulk-power supplies, the isolated module's performance is limited.

FIG. 2 shows an alternate prior art configuration that employs a single isolated power module 201 and multiple non-isolated Point of Load (POL) modules 211-213 downstream. The advantage of this configuration is that the POL modules 211-213 are much lower cost than an isolated module. If numerous rails are in the system, the customer may buy one relatively high power, expensive isolated module such as module 201 and use it to power several POL modules. However, this approach still requires the customer to buy multiple building block products and does not guarantee the system will be optimized for performance and cost or that it will even work properly when the building blocks are assembled together.

The manufacturers of commercially available power converters would prefer to sell one product family for use in many power systems. However, differences in system level requirements, such as cross-system compatibility is an ongoing challenge. Systems vary widely in terms of power levels, the number of voltage rails required, and sensitivity to cost and performance metrics such as transient response.

From the customer perspective, end users would prefer to specify a custom power system that is fine tuned to their application. However, the cost associated with a custom power system is generally prohibitive for most end users. Power supply manufacturers have responded by creating "building blocks" or families of brick modules that achieve relatively good cost structures by being usable by multiple customers and generally compatible from one brick to the next. Several standard footprints have been proposed by industry alliances with the goal of providing multi-sourcing options for end users.

While the prior art does offer a workable solution to power module users, it is not ideal. As explained above, customers must purchase several power modules, each with its own built-in labor and profit structure, instead of buying a single part. Furthermore, the building blocks may not be especially well tuned to the customer's application. The building blocks may have compatibility issues between them even when manufactured by the same supplier. Ensuring compatibility from multiple suppliers therefore becomes an even bigger problem to manage.

Customers frequently do not have detailed schematics or know how to optimize the performance of the power module system when the various components are put together. Therefore, they may end up adding excessively large and expensive capacitor banks to ensure system stability. Alternatively, customers may raise system cost by over specifying parameters such as the voltage regulation or ripple/noise requirements of the individual power modules in order to have the best chance of the system working once the various pieces are assembled together. To overcome these challenges power module manufacturers quite often wind up making semi-customized or modified versions of their standard products in order to work properly in the customer systems, thereby entailing the excessive cost structures they are attempting to avoid in the first place.

SUMMARY OF THE INVENTION

The present invention provides a configurable dc-dc power converter module and method of manufacture for such module. The power converter module comprises an isolated subassembly with a capacitor bank and an isolated power train that converts an input voltage to an intermediate bus voltage. The power module further comprises multiple non-isolated power trains electrically coupled to the isolated subassembly that are powered by the intermediate bus voltage to produce output voltages. The various non-isolated power trains can be populated or depopulated depending upon the number of voltage rails required and the power level required from them. The number of output voltages is determined by the number of populated non-isolated power trains, which may include all of the non-isolated power trains in the power module or a subset thereof. This variability in populated non-isolated power trains allows end users to add features or rails to later designs without changing the basic module family that they are using.

In one embodiment of the invention the non-isolated power trains are located on a carrier PWB that is electrically coupled to the bus PWB containing the isolated subassembly. The carrier PWB may occupy the same footprint as the bus PWB or may have a smaller or larger footprint than the bus PWB and be either symmetric or asymmetric to the PWB.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

FIGS. 4A-4D show a multi-PWB power module configuration in accordance with an embodiment of the present invention;

DETAILED DESCRIPTION OF THE DRAWINGS

Figure 1:
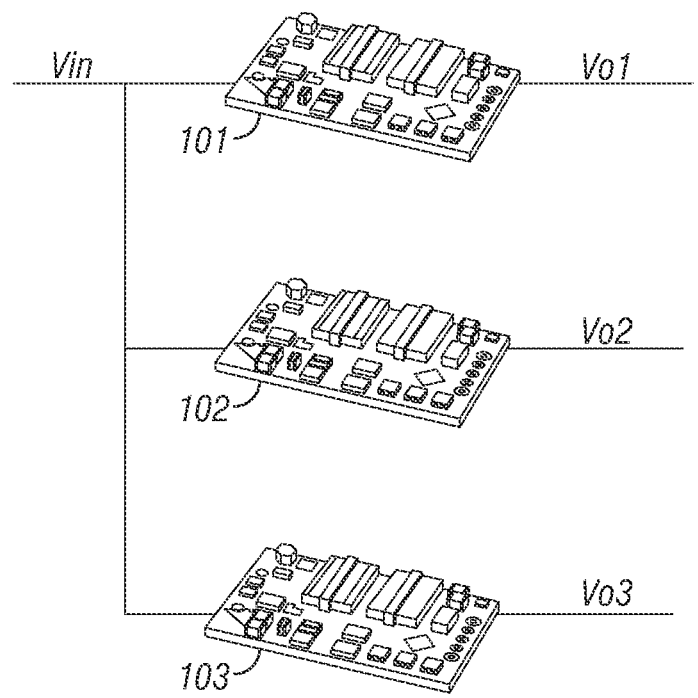
FIG. 1 shows a typical prior art configuration that employs separate isolated modules for each output voltage rail.
Figure 2:
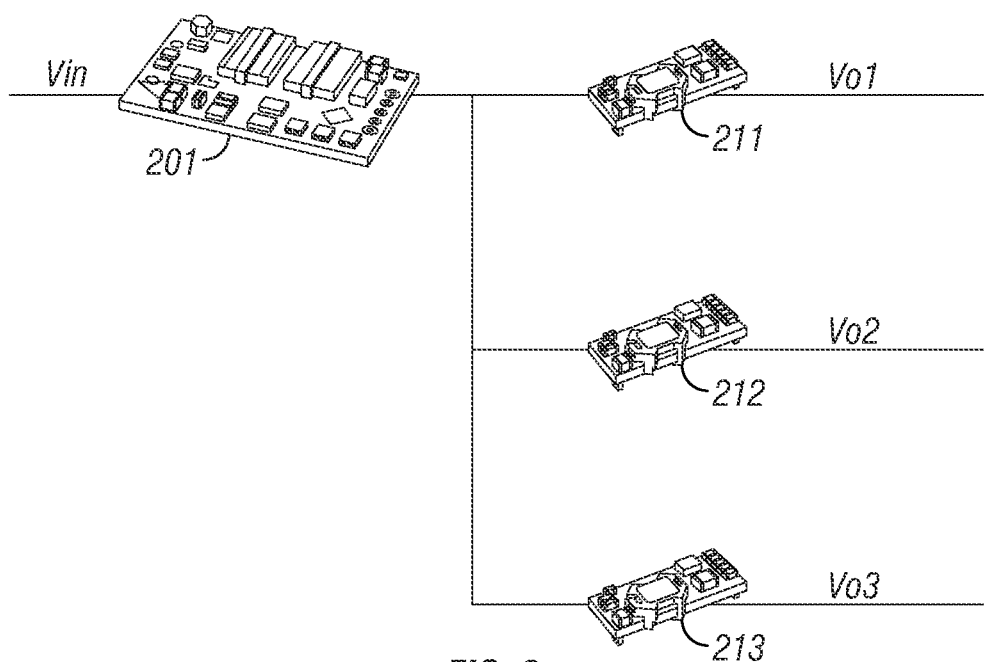
FIG. 2 shows an alternate prior art configuration that employs a single isolated power module and multiple non-isolated Point of Load (POL) modules downstream.

The present invention provides a multiple-output dc-dc power converter module that can be configured quickly for use in a customer system. The power module feature isolation between input and output, and generates an intermediate bus voltage. The bus voltage is used to power multiple non-isolated power trains that are located on the same circuit board or are modules/carrier boards that are soldered to the same circuit board as the power module. The non-isolated modules can be either populated or depopulated to meet customer system requirements and optimize the cost structure.

FIGS. 3A-3D are block diagrams of a multiple-output power module in accordance with embodiments of the present invention. In this configuration, the power module 300 comprises an isolated power train 310 and multiple non-isolated power trains 311-316.

The power module 300 can be configured for customer requirements by populating a subset of the non-isolated power trains to produce the needed number of output voltages. This populated subset can be equal to or less than the total number of non-isolated power trains. In the present example shown in FIG. 3, non-isolated power trains 311, 312, and 314 are populated for output voltage Loads 1-N, and the loads of non-isolated power trains 313, 315, and 316 are not populated. In the embodiments shown in FIGS. 3B-3D, output Load 1 is connected to an external point of load 321.

Module 300 might also include an optional intermediate bus voltage output 320 for embedded rails or powering auxiliary loads such as fans 322. The auxiliary bus output 320 also adds an option for increasing bulk capacitance on the intermediate bus and for powering other loads 323 if desired.

Figure 3A:
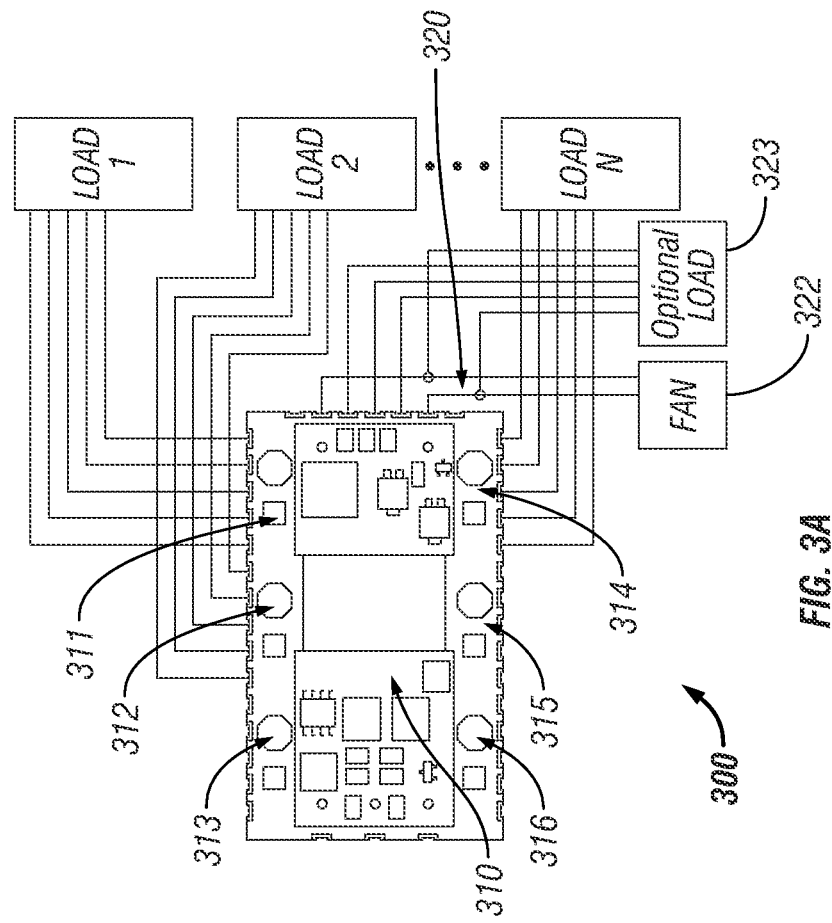
FIGS. 3A-3D are block diagrams of a multiple-output power module in accordance with embodiments of the present invention.
Figure 3B:
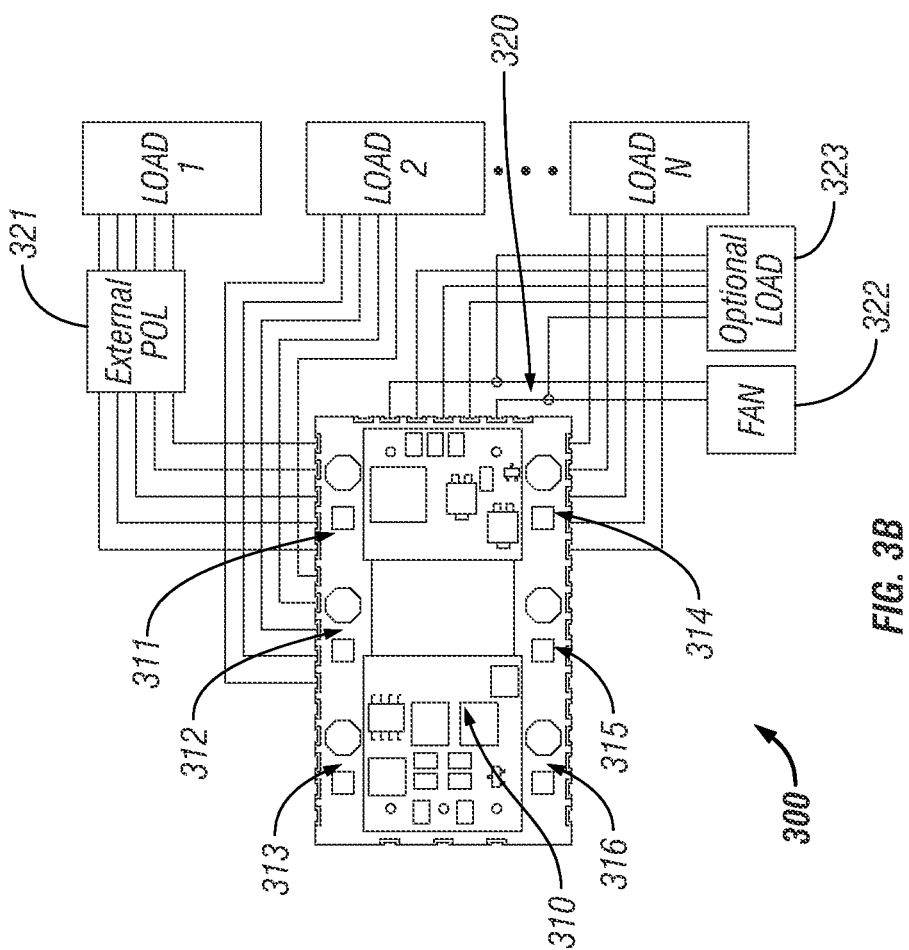
Figure 3C:
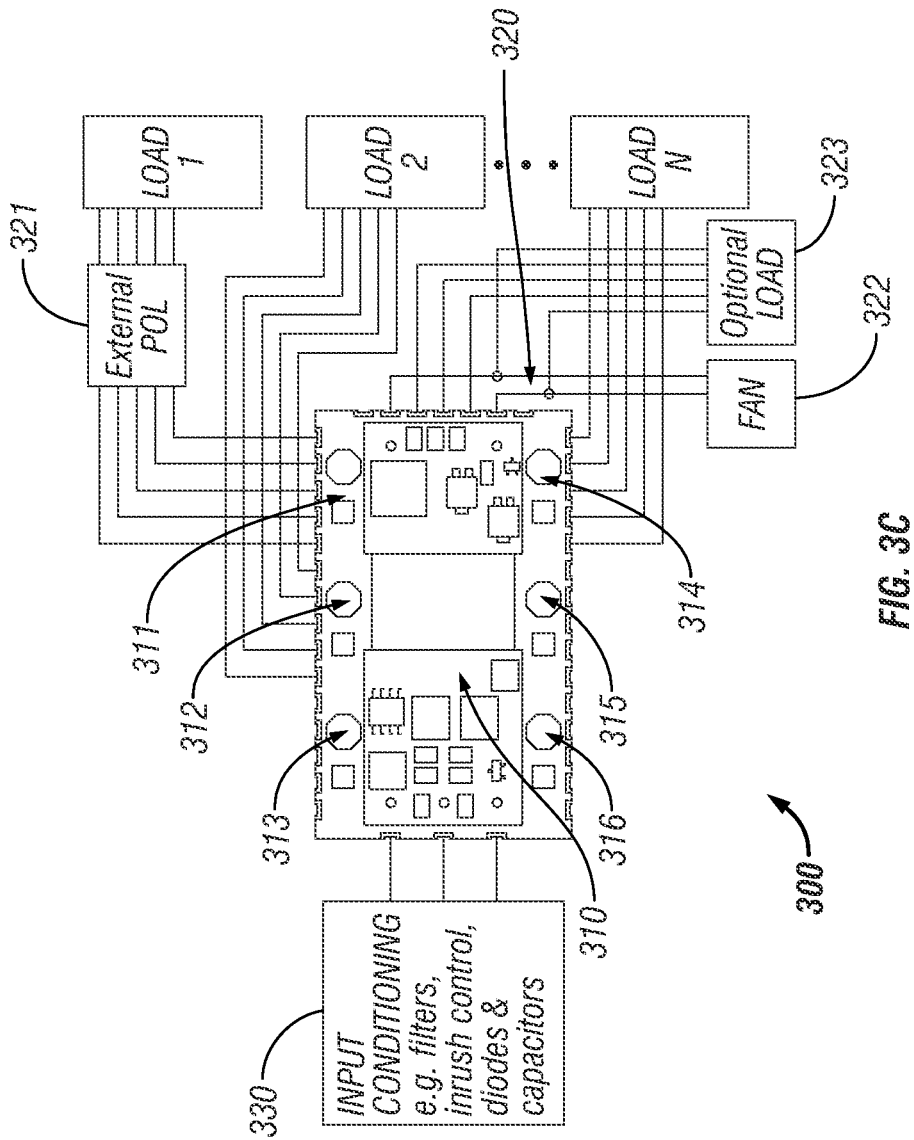

FIG. 3C shows the voltage input conditioning components 330 for the power control module 300. Examples of input conditioning components include capacitors, inrush control, diodes and chokes. These integrated components can simplify the customer design in meeting EMI/EMC, hot plug-in, start-up sequencing, and other system requirements. In the example shown in FIG. 3C, the input conditioning 330 is external to the power module brick 300.

Figure 3D:
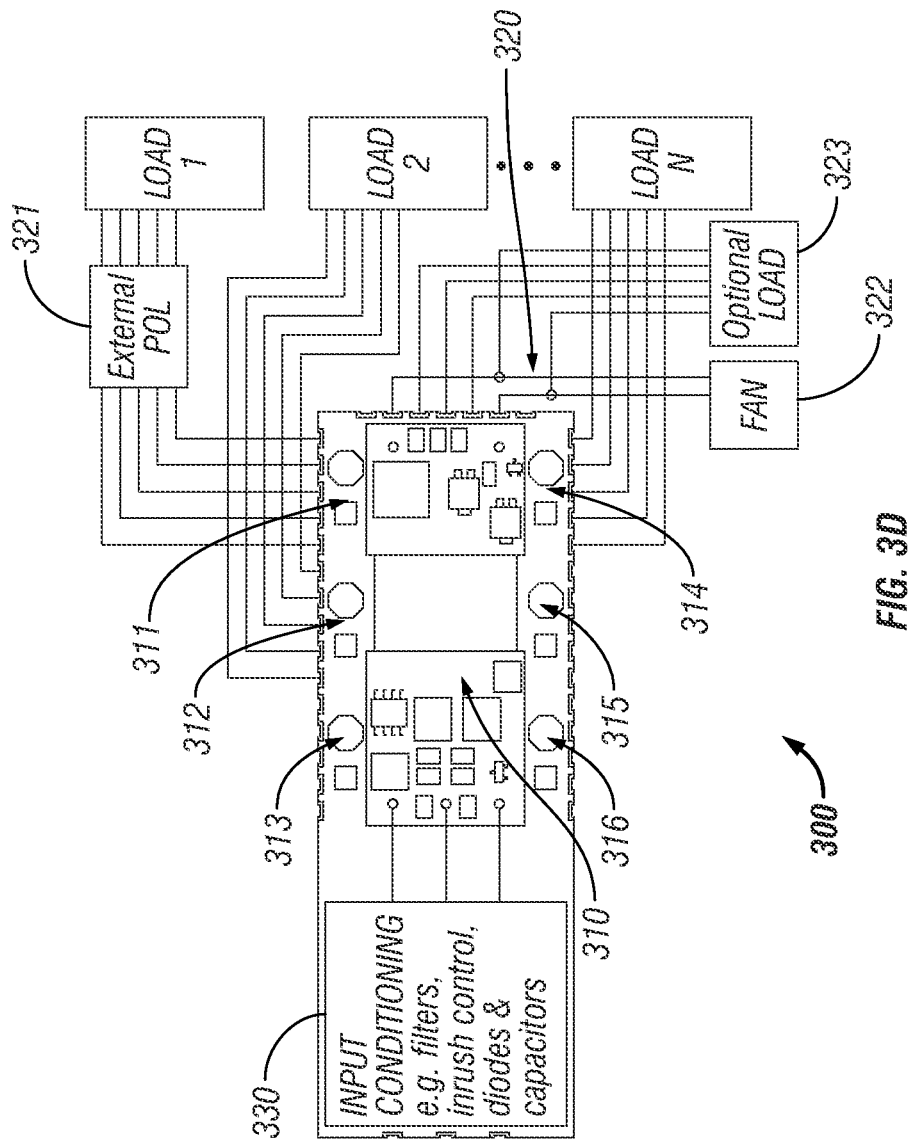

FIG. 3D shows an alternate embodiment of the present invention in which the input conditioning elements 330 are incorporated into the power module brick 300.

One embodiment of the present invention includes a digital controller that senses and adjusts the isolated and non-isolated components. Traditionally, DC-DC power converters have been implemented using analog control circuits for most if not all control functions including Pulse Width Modulation/Metal Oxide Semiconductor Field Effect Transistor (PWM/MOSFET) switching control, protection functions, customer interface circuits like on/off control and customer monitoring functions like current monitoring. More recently digital integrated circuits (ICs) have been used to advantage. The digital ICs have the benefits of lower parts count and most significantly the ability to change or modify performance by software or firmware rather than by changing hardware/resistor and capacitor values. Many digital controllers also offer multiple PWM outputs suitable for controlling multiple power trains as disclosed here.

Within the industry digital control generally refers to a DC-DC converter wherein all control functions, including the control loop/MOSFET control are implemented using a digital control IC, e.g. a DSP (Digital Signal Processing) or microprocessor. The digital controller should be relatively high speed and high performance.

Digital power management generally refers to a DC-DC converter wherein some of the auxiliary functions such as over temperature protection and on/off control are implemented by a digital IC. In this configuration the digital IC can be much a lower cost/performance type. Frequently a cheap microcontroller can be used.

Customers may not care whether or not the control loop is digital. One embodiment of the invention incorporates an analog controller with digital communication/telemetry features. The digital power management could include the ability to have communication to provide basic control of the module and telemetry. For example, over a digital bus a customer could tell the module to turn on and report the module efficiency. The customer can then adjust the output voltage slightly and check efficiency again to see if the change was helpful. Additionally, the digital power management could self-adjust to optimize performance, by monitoring its own performance (e.g., Efficiency, output loading, etc) and adjusting operating parameters (e.g., bus voltage, operating frequency, etc).

One negative aspect of many prior art power converter modules is that every module has its own set of pins and its own digital IC. In the testing scenario described above the customer may need to interact with an IC on the isolated module and on every non-isolated module.

In one embodiment of the present invention all of these separate microcontrollers or DSPs are replaced by a single one that communicates with and controls all of the power trains. Another embodiment of the present invention retains the separate digital controls for the isolated and non-isolated module, but they are mounted on one PWB. In either embodiment, a customer can use the industry standard Power Management Bus (PMBus) protocol to give commands/instructions to the digital ICs. The commands can be issued over either a serial bus or a parallel bus. Of course any other bus can also be used with the invention. This allows communication between power stages to be performed without additional pins or the end user needing to add connections between modules that could be located at remote locations. The non-isolated power trains can be controlled individually or as a group by a single controller.

The present invention achieves economy of scale because the multi-output circuit board can be configured for many possible end users. The various non-isolated power trains can be populated or depopulated depending upon the number of voltage rails required and the power level required from them, which allows end users to add features or rails to later designs without changing the basic module family that they are using.

Because the multiple non-isolated POLs are incorporated into the same module as the isolated power train, the power trains can be better optimized without the need to over-size to overcome uncertainty about applied loading or thermal characteristics. Because the integration of the power trains is performed by the module manufacturer the end user is ensured that system stability and performance will be as expected without having to over design the capacitor banks or use ultra stringent requirements. This allows for reduced costs and greater flexibility in manufacturing without sacrificing stability and performance across different layouts and end user requirements.

Electromagnetic interference (EMI) and input conditioning can be better evaluated on the power converter module of the present invention because there is less variation from layout to layout compared with the prior art, which further reduces the number of application issues. Issues such as sequencing and startup characteristics can be fully evaluated on the module to further reduce the likelihood of application related incompatibility issues from occurring.

The module of the present invention also has fewer terminals for the user to solder down because connections are made on the fully tested module. In addition, the power module manufacturer only needs to charge overhead, handling and packaging fees for a single unit instead of many individual power units. For small, low cost items like traditional POL modules, these fees can be a significant percentage of the overall customer pricing.

Other system level features such as inrush control, hot swap control, electromagnetic interference (EMI) filters, fuses, capacitors, chokes, diodes and reverse polarity protection can easily be integrated to form a hybrid approach with POL or multi-POL modules.

The block diagrams depicted in FIGS. 3A-3D show all components of the power module located on a single printed wiring board (PWB). However, the module components can also be divided between multiple PWBs, wherein the non-isolated power trains are located on carrier PWBs that are soldered to the same circuit board as the power module.

FIGS. 4A-4D show a multi-PWB power module in accordance with an embodiment of the present invention. FIG. 4A shows a perspective view of the multi-PWB module 400. A side view of the power module is shown in FIG. 4B. FIG. 4C shows a top plan view of the power module, and FIG. 4D shows the bottom plan view of the module. In this example, the isolated components of the module 400 are mounted on the top bus PWB 410. The non-isolated power trains 430 are located on the bottom carrier PWB 420.

The multi-PWB layout shown in FIGS. 4A-4D has the advantage of providing considerable manufacturing flexibility to the power module. The design of the top and bottom PWBs is independent of each other, with each PWB being independently scalable. The isolated subassembly on the top PWB 410 can operate with a fixed duty cycle or with a variable duty cycle. The variable duty cycle can be adjusted to changes in the operating point such as, e.g., input voltage, output voltage, operating current, and/or operating temperature.

Just as in the block diagram shown in FIG. 3, there are multiple non-isolated POLs 430 on the bottom carrier PWB 420. The POLs 430 on the bottom PWB 420 can be populated or not depending on the needs of the end user as explained above. All outputs may or may not share the same ground (i.e. output minus pin), and each output may have a different number of pins (e.g. some 4, others 3 or 2). Pin width may differ, and the pin pitch of each output may be different as well (e.g. some 0.15" (3.81 mm), others 0.10" (2.54 mm)).

In the present example, the POL outputs 430 are implemented as Edge Plated Castellation (EPC) pads to reduce cost. Alternatively, mechanical terminals may be added that are either surface mount (SMT) type or through-hole type. The layout of these EPC pads may be either symmetric or asymmetric to the centerlines of both top and bottom PWBs 410, 420, i.e. locations differ from place to place. Zoning may also be used for different outputs on the bottom carrier PWB. Depending on the output requirements, components may not be populated in all zones.

The interconnect pins 440 (shown in FIG. 4B) that connect the bus and carrier PWBs 410, 420 can be of different diameters, and be placed at the spots where current-carrying, heat-dissipation or a stronger mechanical joint is required. The interconnect pins 440 can be traditional surface mount terminal (SMT) pins or through-hole type pins.

Figure 5A:
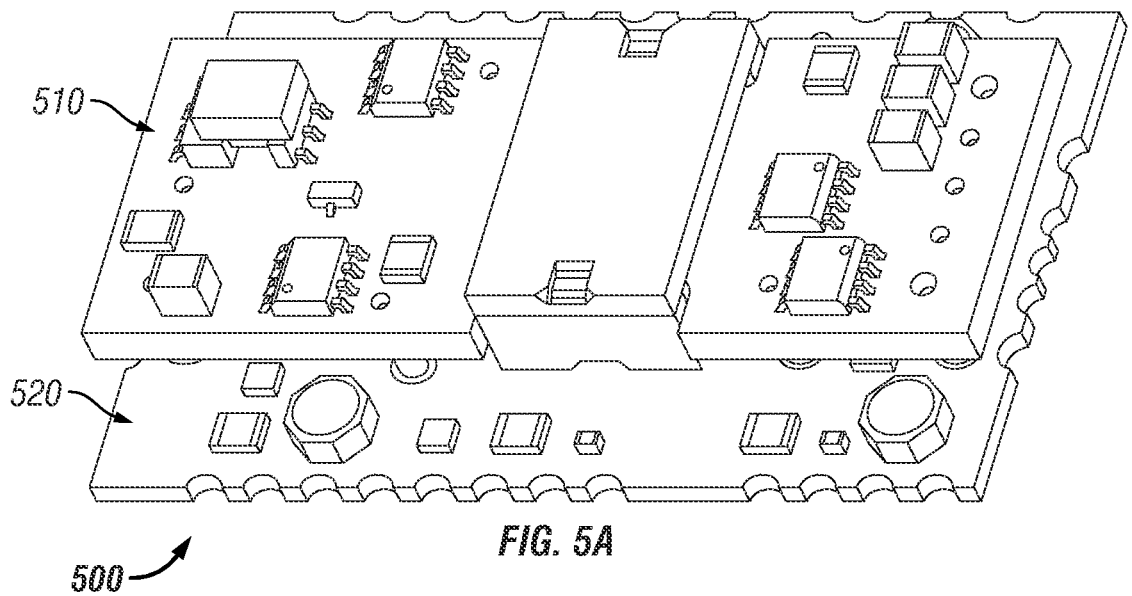
FIGS. 5A-5B show an alternate multi-PWB embodiment of the present invention in which the footprints of the PWBs differ.
Figure 5B:
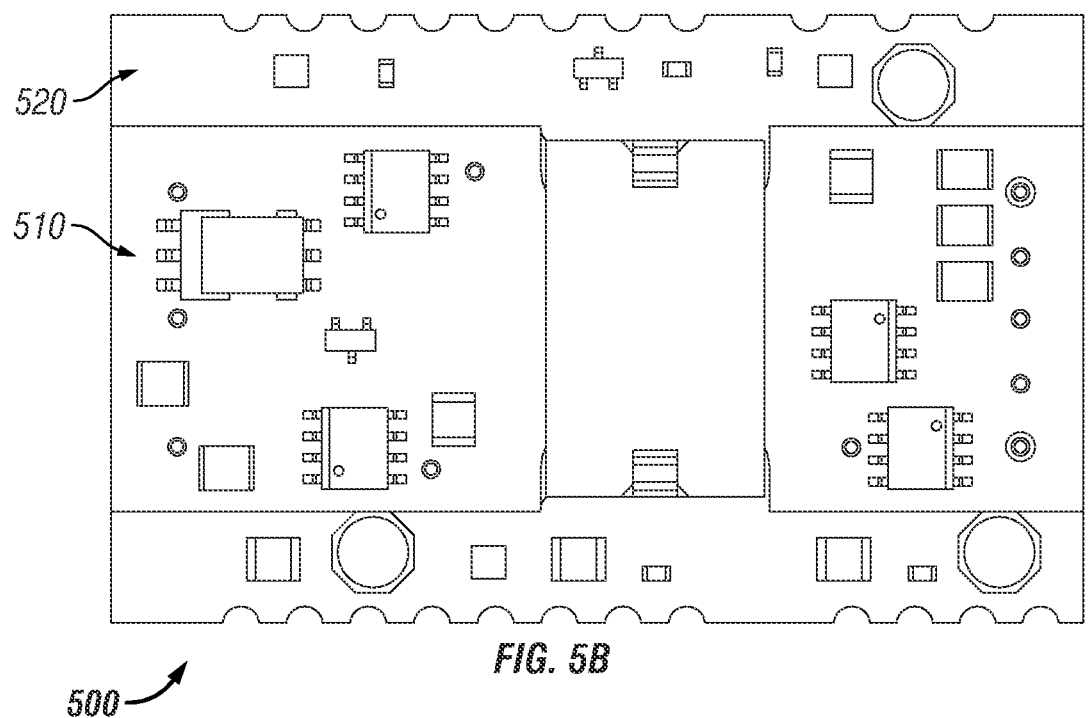

In the example shown in FIGS. 4A-4D the two PWBs are the same size/form factor and have the same outline, which is shown most clearly in FIGS. 4C and 4D. FIGS. 5A and 5B show an alternate multi-PWB embodiment of the present invention in which the outline of the PWBs differ. In this example, the bus PWB 510 of module 500 is identical to PWB 410 of module 400. However, the carrier PWB 520 in this embodiment has a larger outline than the top PWB 510.

In the multi-PWB configurations, the carrier PWB features several interconnection joints to the motherboard. These joints are solderable and easy to visually inspect for soldering quality. The interconnection joints can be formed using technologies including but not limited to Edge Plated Castellations (EPC), Land Grid Array (LGA) pad patterns, mechanical through-hole type terminals, or surface mount pins.

The possible configurations of the present invention are not limited to the ones shown in FIGS. 4 and 5. The bottom carrier PWB may be bigger or smaller than the top PWB, and may be symmetric or asymmetric to the top PWB.

Figure 6:
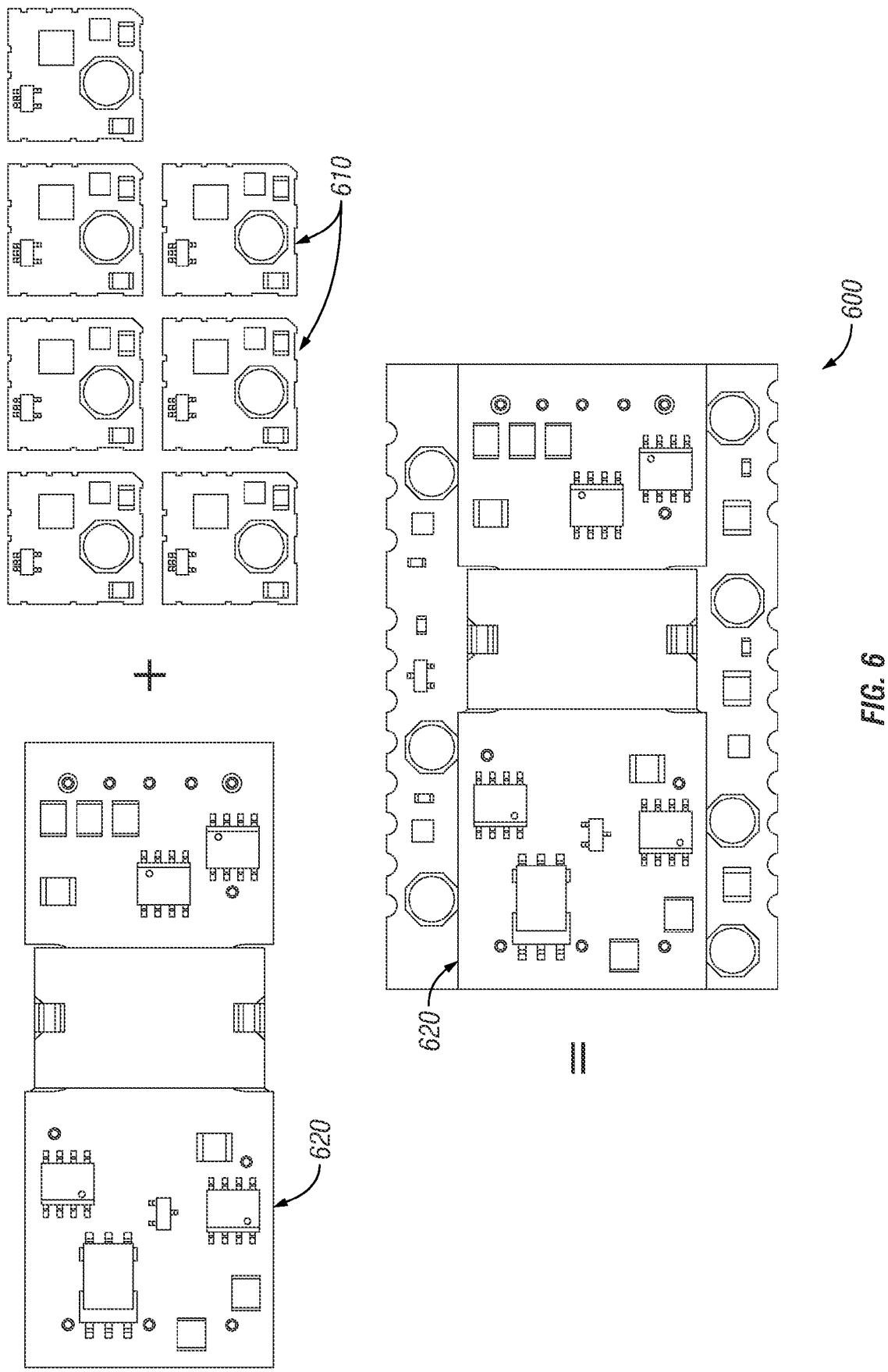
FIG. 6 shows a carrier PWB containing non-isolated power trains in accordance with an embodiment of the present invention.

FIG. 6 shows a carrier PWB containing multiple non-isolated power trains in accordance with an embodiment of the present invention. This example illustrates some of the manufacturing advantages of the present invention. In this embodiment, the PWB 600 is a combination of several non-isolated power train blocks 610. This approach greatly simplifies manufacturing by allowing the same or similar non-isolated power train layouts 610 to be repeated as needed to reach the necessary number of POLs for the footprint in question, regardless of whether all of the POLs are populated. In addition, an isolated power train 620 can be assembled onto the PWB 600 as a source of providing bus voltage. The final footprint area is less than the sum of isolated module 620 and individual non-isolated layouts 610, which leaves more room on a motherboard to place components.

Figure 7:
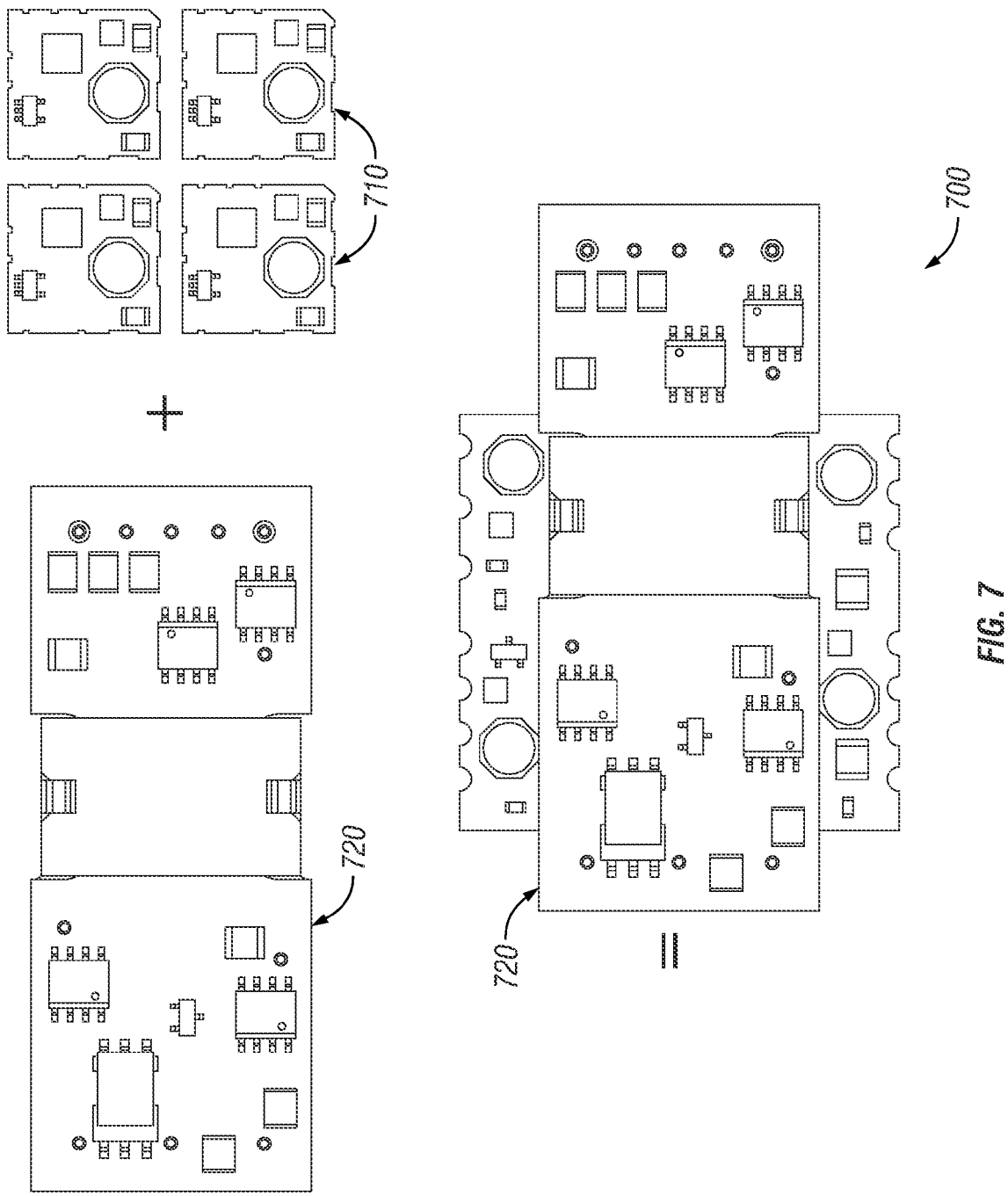
FIG. 7 shows an alternate embodiment in which the non-isolated power train is implemented on the carrier PWB.

FIG. 7 shows an alternate embodiment in which the non-isolated power train is implemented on the carrier PWB. As with the previous embodiment, the PWB 700 comprises multiple non-isolated blocks 710. However, in this embodiment, the PWB 700 has a different footprint from other PWBs such as the isolated power train 720. This approach also greatly simplifies manufacturing by allowing existing non-isolated power train layouts 710 to be repeated as needed to reach the necessary number of POLs for the footprint in question, regardless of whether all of the POLs are populated. By simply repeating the existing power train layout 710, the manufacturing method of the present invention considerably reduces product development time. The PWB 700 comprising the non-isolated layouts 710 may be shorter than the isolated power train PWB 720 and may also be off the center of the first PWB 720. In addition to PWBs 700 and 720 differing in their respective footprints, the combined footprint may be less than two separate footprints, thereby leaving more room on a motherboard to place components.

This embodiment illustrates the flexibility in manufacturing provided by the present invention by allowing the power train blocks to be mixed and matched as necessary to achieve end user requirements, which allows a more customization design for particular end users' requirements, while still maintaining ease of manufacturing.

In the multi-PWB embodiments described above, the PWBs can also operate separately as stand alone modules.

The top and bottom PWBs can be sold as separate stand alone products. The entire power module can be populated as a whole on a motherboard or can be installed separately in different locations based on customer requirements. This allows the end user to obtain the top and bottom PWBs from different manufacturers rather than purchasing the whole module as a unit. Such an approach obviously sacrifices the predictable stability and reliability described above but may provide end users with greater more options.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. It will be understood by one of ordinary skill in the art that numerous variations will be possible to the disclosed embodiments without going outside the scope of the invention as disclosed in the claims.

We claim:

1. A configurable DC-DC power converter module comprising:
   (a) a first printed wiring board (PWB);
   (b) an isolated power train mounted on said first PWB that converts an input voltage to an intermediate bus voltage; and
   (c) a plurality of non-isolated power trains, mounted on said first PWB, electrically coupled to said isolated power train to produce a plurality of respective output voltages;
   wherein
   said plurality of respective output voltages are determined by a populated subset of said non-isolated power trains; and
   said populated subset is less than the total number of non-isolated power trains in said DC-DC power converter.

2. The DC-DC power converter module according to claim 1, further comprising an intermediate bus voltage output.

3. The DC-DC power converter module according to claim 1, further comprising at least one controller that senses and adjusts said isolated and said non-isolated power trains of said DC-DC power converter.

4. The DC-DC power converter module according to claim 3, further comprising a plurality of controllers.

5. The DC-DC power converter module according to claim 3, wherein said controller is a digital controller.

6. The DC-DC power converter module according to claim 5, wherein said digital controller communicates via Power Management Bus (PMBus) protocol.

7. The DC-DC power converter module according to claim 5, wherein said digital controller issues commands over either a serial bus or a parallel bus.

8. The DC-DC power converter module according to claim 3, wherein said controller is an analog controller.

9. The DC-DC power converter module according to claim 8, wherein said DC-DC power converter further comprises digital communication and telemetry.

10. The DC-DC power converter module according to claim 3, wherein a single controller controls more than one power train.

11. The DC-DC power converter module according to claim 3, wherein each power train is controlled individually.

12. A configurable DC-DC power converter module comprising:
    (a) a first printed wiring board (PWB);
    (b) an isolated power train mounted on said first PWB that converts an input voltage to an intermediate bus voltage; and
    (c) a plurality of non-isolated power trains, mounted on a second PWB, electrically coupled to said isolated power train to produce a plurality of respective output voltages;
    wherein
    said plurality of respective output voltages are determined by a populated subset of said non-isolated power trains; and
    said populated subset is less than the total number of non-isolated power trains in said DC-DC power converter.

13. The DC-DC power converter module according to claim 12, wherein said second PWB includes multiple interconnection joints for soldering said DC-DC power converter to a motherboard, wherein said interconnection joints are subject to visual inspection for soldering quality.

14. The DC-DC power converter module according to claim 13, wherein said interconnection joints are formed of at least one of the following:
    EPC (Edge Plated Castellation);
    LGA (Land Grid Array) pad patterns;
    mechanical through-hole type terminals;
    surface mount pins.

15. The DC-DC power converter module according to claim 12, wherein said first PWB and said second PWB are interconnected by surface mount terminal (SMT) pins.

16. The DC-DC power converter module according to claim 12, wherein said first PWB and said second PWB are interconnected by through-hole pins.

17. The DC-DC power converter module according to claim 12, wherein said first PWB and said second PWB have different sizes and outlines.

18. The DC-DC power converter module according to claim 12, wherein said first PWB and said second PWB operate separately as stand alone modules.

19. The DC-DC power converter module according to claim 1, wherein said isolated power train further comprises a second PWB that is electrically coupled to said first PWB.

20. The DC-DC power converter module according to claim 1, wherein said isolated power train operates with a fixed duty cycle.

21. The DC-DC power converter module according to claim 1, wherein said isolated power train operate with a variable duty cycle.

22. The DC-DC power converter module according to claim 21, wherein said duty cycle is adjusted in response to a change in at least one of the following parameters:
    input voltage;
    output voltage;
    operating current;
    operating temperature.

23. The DC-DC power converter module according to claim 1, further comprising input conditioning components.

24. The DC-DC power converter module according to claim 23, wherein said input conditioning components are external to said first PWB.

25. The DC-DC power converter module according to claim 23, wherein said conditioning components are mounted on said first PWB.

26. A method of manufacturing a configurable DC-DC power converter module comprising:
   (a) electrically coupling an isolated power train to at least a first printed wiring board (PWB), wherein said isolated power train converts an input voltage to an intermediate bus voltage;
   (b) electrically coupling a plurality of non-isolated power trains, mounted on said first PWB, to said isolated power train, wherein said non-isolated power trains produce a plurality of respective output voltages; and
   (c) populating a subset of said non-isolated power trains to produce a specified number of output voltages;
   wherein
   said subset of said non-isolated power trains is less than the number of total non-isolated power trains in said DC-DC power converter module.

27. The manufacturing method according to claim 26, further comprising providing an intermediate bus voltage output.

28. The manufacturing method according to claim 26, further comprising providing at least one controller that senses and adjusts said isolated and non-isolated power trains of said DC-DC power converter.

29. The manufacturing method according to claim 28, further comprising providing multiple controllers.

30. The manufacturing method according to claim 28, wherein said controller is a digital controller.

31. The manufacturing method according to claim 30, wherein said digital controller communicates via Power Management Bus (PMBus) protocol.

32. The manufacturing method according to claim 30, wherein said digital controller issues commands over either a serial bus or a parallel bus.

33. The manufacturing method according to claim 28, wherein said controller is an analog controller.

34. The manufacturing method according to claim 33, wherein said power converter further comprises digital communication and telemetry.

35. The manufacturing method according to claim 28, wherein a single controller controls more than one power train.

36. The manufacturing method according to claim 28, wherein each power train is controlled individually.

37. A method of manufacturing a configurable DC-DC power converter module comprising:
   (a) electrically coupling an isolated power train to at least a first printed wiring board (PWB), wherein said isolated power train converts an input voltage to an intermediate bus voltage;
   (b) electrically coupling a plurality of non-isolated power trains, mounted on a second PWB, to said isolated power train, wherein said non-isolated power trains produce a plurality of respective output voltages; and
   (c) populating a subset of said non-isolated power trains to produce a specified number of output voltages;
   wherein
   said subset of said non-isolated power trains is less than the number of total non-isolated power trains in said DC-DC power converter module.

38. The manufacturing method according to claim 37, further comprising providing said second PWB with multiple interconnection joints for soldering said DC-DC power converter to a motherboard, wherein said interconnection joints are subject to visual inspection for soldering quality.

39. The manufacturing method according to claim 38, further comprising forming said interconnection joints from at least one of the following:
   EPC (Edge Plated Castellation);
   LGA (Land Grid Array) pad patterns;
   mechanical through-hole type terminals;
   surface mount pins.

40. The method according to claim 37, further comprising interconnecting said first PWB and said second PWB by surface mount terminal (SMT) pins.

41. The manufacturing method according to claim 37, further comprising interconnecting said first PWB and said second PWB by through-hole pins.

42. The manufacturing method according to claim 37, wherein said first PWB and said second PWB have different sizes and outlines.

43. The manufacturing method according to claim 37, wherein said first PWB and said second PWB operate separately as stand alone modules.

44. The manufacturing method according to claim 37, further comprising constructing said second PWB using an existing single non-isolated power train layout that is repeated to produce a desired number of non-isolated power trains, thereby reducing product development time.

45. The manufacturing method according to claim 37, wherein said first PWB and said second PWB are salable as separate stand alone products.

46. The manufacturing method according to claim 26, further comprising locating said isolated power train on a second PWB that is electrically coupled to said first PWB.

47. The manufacturing method according to claim 26, further comprising mounting conditioning components on said first PWB.

* * * * *